Dec. 12, 1933.   G. M. DARBY ET AL   1,938,894
THICKENER
Filed May 7, 1931   2 Sheets-Sheet 1

Inventor
GEORGE M. DARBY
ERNEST J. MAUST
By
Attorney

Dec. 12, 1933.  G. M. DARBY ET AL  1,938,894
THICKENER
Filed May 7, 1931   2 Sheets-Sheet 2

Inventor
GEORGE M. DARBY
ERNEST J. MAUST

Attorney

Patented Dec. 12, 1933

1,938,894

UNITED STATES PATENT OFFICE 1,938,894

THICKENER

George M. Darby, Westport, Conn., and Ernest J. Maust, New York, N. Y., assignors, by mesne assignments, to The Dorr Company, Inc., New York, N. Y., a corporation of Delaware Application May 7, 1931. Serial No. 535,722

3 Claims. (Cl. 210—55)

The present invention relates to the thickening or dewatering of pulp by decantation or sedimentation and seeks to further the extent to which it has heretofore been possible to dewater various pulps or sludges, and to effect improvement in operating conditions and economy in practice, by reducing the depth of the compression zone and the time required for dewatering to a given density.

With most pulps muds or sludges there is a practical limit to the extent to which it is possible to dewater by settling according to present practice, in either batch settling or continuous settling, and with some pulps and particularly organic pulps this heretofore possible limit is not only relatively low and the settling rate slow but the practical limit is further reduced by a tendency to decomposition or spoilage in time, which may necessitate a shortening of the detention period to less than that required for maximum thickening under the known methods. This is particularly true of gluten, a by product of the manufacture of corn starch, which finds its chief commercial value as a cattle feed and is therefore rendered valueless if permitted to decompose with resultant objectionable odor. The present invention is therefore of great utility in the dewatering of gluten pulp. Although herein described with special reference to gluten its use is of special advantage with pulps difficult to settle such as sewage and other light flocculent pulps tending to entrap water in the compression zone and prevent consolidation of solids.

The objects of the invention are obtained through utilization in an effective and practical manner, of the discovery that stirring of the pulp or sludge in the compression zone results in an increase in both the rate of dewatering and the final density. This stirring is not simply a stirring of the mass as a whole nor a violent stirring productive of turbulence, but a slight stirring at innumerable points in a localized manner to bring about a rearrangement of the flocs into a denser formation with release of liquid entrapped between them, and to induce the rise of liquid through and out of the compression zone. The gist of the invention is the stirring in the compression zone, and the main object of the invention is brought to its highest fulfillment by passing through the pulp in the compression zone numerous stirring elements arranged to stir or disturb the relation of adjacent flocs along a line extending in a general upward direction and at the same time provide a constantly reforming channel or path of liquid flow along such upwardly extending line.

While the above outline of the invention implies a particular theory of operation, it is to be noted that the invention is partly the result of practical experience, research and discovery, and is not dependent upon the tenability of such particular theory, but may depend upon the utilization of additional or entirely different forces and the existence of additional or entirely different physical characteristics of the materials acted upon.

A preferred embodiment of means for carrying out the invention is illustrated in the accompanying drawings in which.

Figure 1:
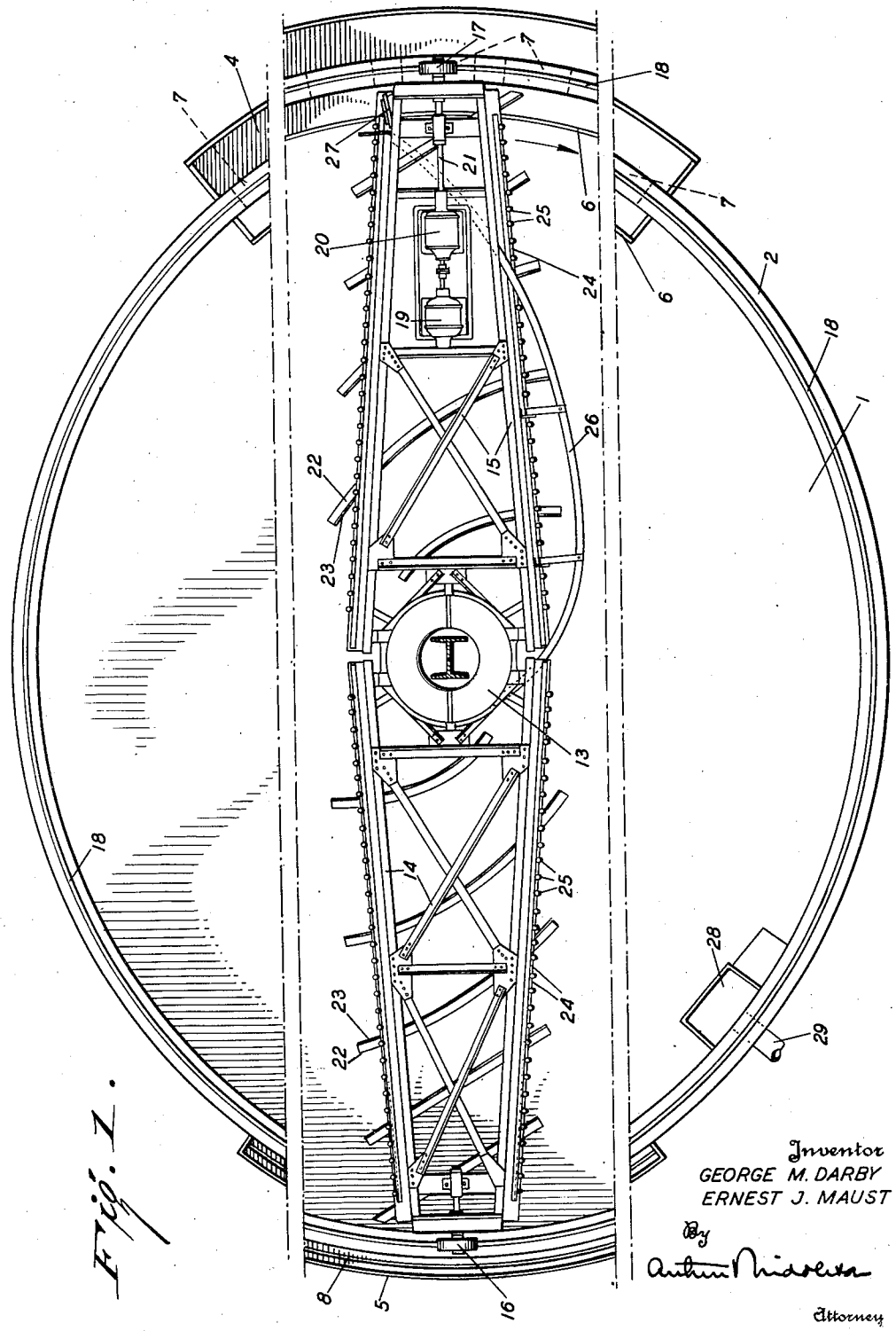
Fig. 1 is a top plan view with portions cut away intermediate the center and sides.
Figure 2:
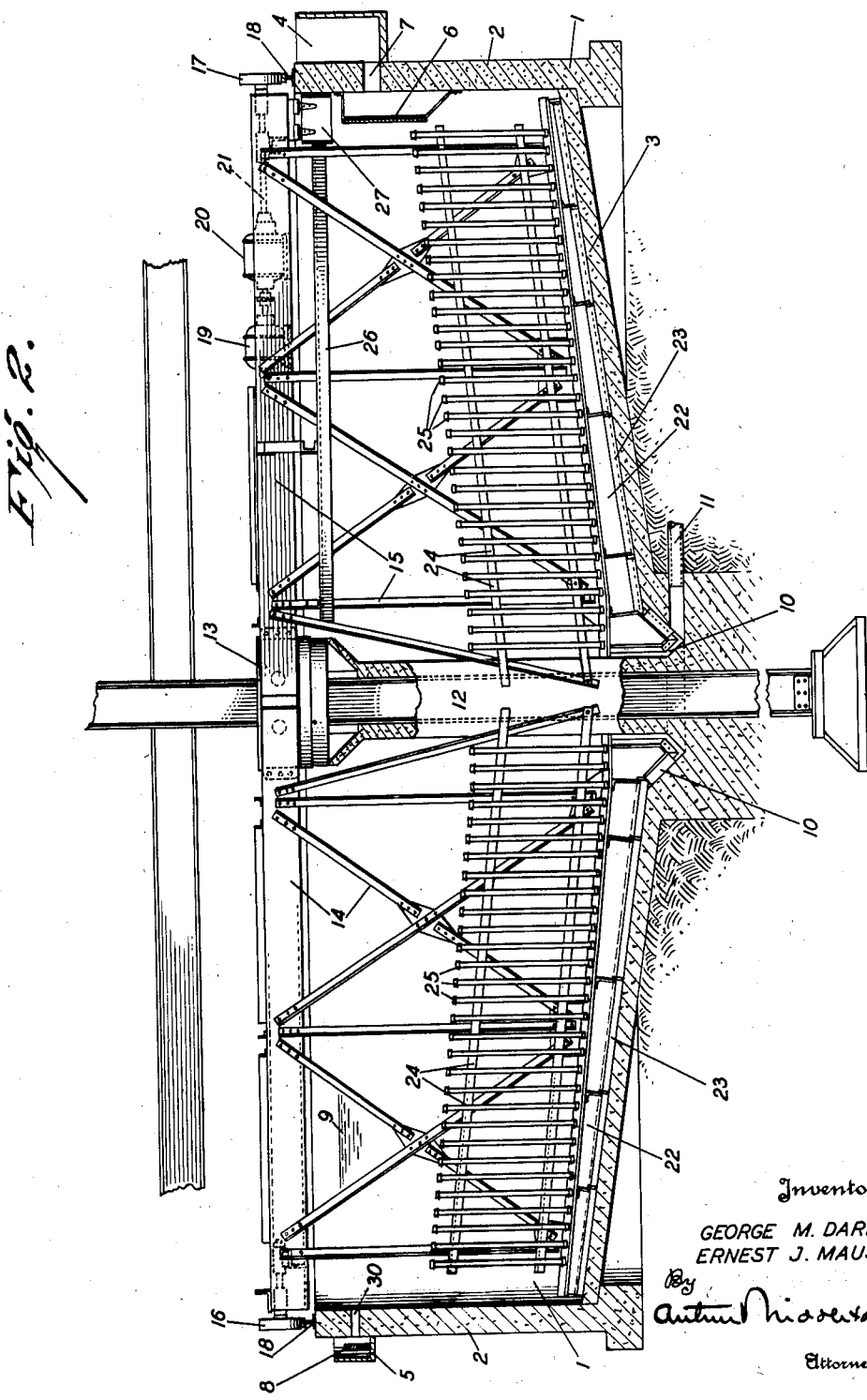
Fig. 2 is a side elevation showing the tank and part of the central pillar in section.

Referring to the drawings in detail, the settling tank or chamber 1 is of the usual type having vertical side walls and a sloping bottom 3, and provided with a feed launder 4 and overflow launder 5. A baffle 6 is arranged within the tank in front of the feed inlet openings 7 leading from the feed launder. An overflow weir 8 in the overflow launder 5 determines the liquid level indicated at 9. The bottom 3 slopes downwardly to a central annular sump or discharge gutter 10 communicating with a discharge line 11. Through the center of the annular sump a pillar 12 rises to the top of the tank where it supports a rotatable hub 13. A pair of radially extending rake trusses or beams 14 and 15 (which if desired may be made as a unitary element) are supported at their central ends on the hub 13 for rotation about the central pillar, and supported at their outer end by supporting wheels 16 and 17 respectively, bearing on circular track 18 mounted on the rim of the tank. The wheel 17 also functions as a traction wheel, for which purpose it is arranged to be driven by a motor 19 through a suitable speed reducer 20 and drive-shaft 21 mounted on the top beams of the truss 15. Energizing current for the motor may be supplied in any known or other suitable manner not shown. The bottom beams of each rake truss carry a series of impelling blades 22 with rubber squeegees 23 contacting with the bottom 3 of the tank and the surface of the annular sump 10, and shaped and arranged to propel or rake the settled solids toward the annular sump and prevent adherence of solids to the surfaces over which they are impelled, all according to standard practice.

Each rake truss also carries at its lower portion one or more spaced picket fence structures 24, but preferably one at each side of the truss, and each composed of a plurality of stirring elements, palings or rods 25 extending upwardly from the top of the scraper blades. These stirring elements are preferably so proportioned in relation to the size and form of the tank and the material to be treated, as to extend substantially throughout the compression zone established during operation on such material. The rods 25 are shown in the drawings to be round in cross-section. While that is the preferred form, other cross-sectional shapes may be used which present a curved or inclined face to the flocs being acted upon so long as the shape brings about the rearrangement of the flocs while passing therearound whereby the channels of upward moving water are formed and reforming during the passage of the rods through the mass of flocculent material to be thickened. If the face of the rod or paling presented to the material is flat, its tendency is to push the material bodily before it instead of displacing adjacent flocs. The example of apparatus here shown is intended for use in the settling of gluten derived as a by-product in the manufacture of corn starch although it is equally applicable for use in sewage sludge. It is therefore preferably provided with a skimmer blade 26 and swing gate 27 carried by the rake truss 15 and arranged upon rotation in the direction indicated by the arrow in Fig. 1, to cooperate in known manner with a scum box 28 and scum outlet 29 to free the surface of the liquid from scum or froth. To maintain separation of scum from the overflow of supernatant liquor the overflow outlet 30 is located below the surface of the liquid.

In operation, the motor 19 and other motivating devices are set into operation to effect rotation of the rake trusses 14 and 15 in a direction as indicated by the arrow in Fig. 1. The pulp, which in the present example is the gluten pulp above mentioned, is fed into the launder 4 from whence it flows into the thickener through openings 7 back of the baffle 6. With the tank filled to the overflow level as determined by the height of the weir 8, there is established a steady gradual flow across the tank from the inlet openings 7 behind the baffle 6 at one side of the tank to the outlet openings 30 at the opposite side. Any scum or froth present rises above the level of the outlets and collects at the top of the liquid from whence it is swept by the skimmer blade 26 and swing gate 27 toward the periphery of the tank into the scum box 28 and out through the scum outlet 29.

The settling of the solids toward the bottom of the tank establishes a clarified zone at the top portion of the body of liquid, a free settling zone below the clarified zone and a compression zone intermediate the free settling zone and the bottom, as will be understood by those skilled in the art. The stirring elements 25, which extend from the top of the rakes up into the compression zone and preferably therethrough slightly into the free settling zone, are slowly moved around the central pillar through the pulp in the compression zone. As the vertical elements or rods 25, which are moved through the flocculent material being settled in the tank, are round in cross-section or otherwise shaped to angularly displace flocs encountered thereby, adjacent flocs coming into engagement with the rods are disturbed in being deflected around the rods 25. Flocs in flowing around the rods are rearranged relative to each other and form two streams, one flowing around one side of the rod and one flowing around the other. These streams meet again at the trailing edge or section of a rod in a stream-line or V-shape, leaving a space between the merger of the streams and the rod. This space constitutes a vertical channel up which flows the water separating out from the flocculent material or pulp being thickened. These channels are not necessarily always present for in practice they form, are broken and then formed again but there is always a strong tendency toward the formation of such channels of upwardly flowing water along the trailing edge of the rods 25. Thus rearrangement of the flocs causes the entrapped liquid to rise and the flocs to settle further into a denser sedimentation which descending to the bottom of the tank is impelled by the travelling scraper blades 22 as underflow along the bottom into the discharge sump 10, from whence it is discharged through underflow discharge line 11.

This kind of stirring not only gives a thicker underflow but reduces the total detention period to one well within the time limit permissible without spoilage of substances heretofore unamenable to proper thickening because of such limitation. It further reduces the depth of the compression zone thus increasing the volume available for clarification with consequent increase in clarity of overflow.

As an example of results attained in practice, with gluten, the present system has given a final density of 16.5 oz. of solids per gallon with 18.5 hours detention, as against 13.8 oz. per gal. with 33 hours detention using the ordinary continuous thickening system; or 11 oz. per gallon with 30 hours detention in the use of the customary batch process.

While a specific embodiment and use of the invention has been herein shown and described by way of example and for the purpose of disclosure, it is to be understood that the invention is not limited to such specific embodiment and use, for it has been designed also for treating sewage so it likewise contemplates all such variants as fairly fall within the scope of the appended claims.

What we claim is:

1. An apparatus for dewatering by a settling and sedimentation process of light flocculent material that is difficult to settle and which tends to hold water entrapped with the flocculent particles as they settle and thus prevent the consolidation of settled flocculent solids, which apparatus comprises in combination a sedimentation tank having a discharge leading from the lower interior portion of the tank and through which discharge settled solids pass from the tank, a feed launder leading to the interior portion of the tank for the delivery of liquid bearing fine or flocculent material to a point which is different from said discharge, and an effluent launder by means of which liquid from the uppermost section of the liquid within the tank passes from the tank and whereby there is determined the level of liquid maintained within the tank, rotatable means providing a framework that comprises radially extending bottom truss members or radial rods carrying raking elements which are located at the lower interior portion of the tank and arranged so that incident to a slow movement of the raking elements there is effected an impelling of settled solids towards said discharge, said framework also carrying closely spaced members or rods that extend upwardly from said bottom truss members whereby there is provided a picket like fence construction for aiding or furthering incident to a slow movement of the picket like fence construction the settling and thickening of the flocculent material, and means for slowly moving said rotatable means in a manner to effect the impelling of settled solids towards the discharge and in a manner whereby the picket-like fence construction will effect a slight localized stirring over an extended area and without any substantial agitation as a whole of the liquid sludge mass within the tank.

2. In the separating out of flocculent and fine material difficult to settle and much of which is in suspension in a liquid carrier, a method comprising supplying of liquid bearing fine material to the interior of a tank, withdrawing of deposited material from the lowermost interior portion of the tank, passing of liquid from the uppermost portion of the body of the liquid within the tank whereby a required head or depth is maintained for the liquid within the tank, moving within the body of the liquid of a series of members that vertically extend substantially from within and above the compression zone within the lower section of the tank at such a slow rate of movement that substantially no circumferential movement is imparted to the liquid, the adjacent ones of which members are spaced only a short distance apart in a horizontal direction, the slow moving of said members being such as to effect a slight stirring at several points in a manner to bring about at localized sections of the liquid body a re-arrangement of the flocs or suspended fine solid material with a consequent denser formation of the flocs and a release of liquid entrapped between them whereby the time for separating out is lessened and proper settling is attained.

3. In the separating out of flocculent and fine material, much of which is in suspension in a liquid carrier, by a method as defined in and by claim 2, the impelling of settled solids towards the place whereat and from which the deposited material is withdrawn from the tank by means of a slowly travelling raking element adjacent the bottom of the tank which withdrawal takes place during the slow moving in the body of liquid within the tank of the series of members that vertically extend from within and above the compression zone maintained in the lower portion of the liquid.

GEORGE M. DARBY.
ERNEST J. MAUST.